United States Patent
Taniguchi et al.

(10) Patent No.: US 9,853,559 B2
(45) Date of Patent: Dec. 26, 2017

(54) POWER CONVERSION DEVICE WITH REDUCED CURRENT DEVIATION

(71) Applicant: DAIKIN INDUSTRIES, LTD., Osaka-shi, Osaka (JP)

(72) Inventors: Tomoisa Taniguchi, Osaka (JP); Morimitsu Sekimoto, Osaka (JP); Takurou Ogawa, Osaka (JP); Eiji Tooyama, Osaka (JP); Nobuo Hayashi, Osaka (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 0 days.

(21) Appl. No.: 15/123,564

(22) PCT Filed: Mar. 27, 2015

(86) PCT No.: PCT/JP2015/001800
§ 371 (c)(1),
(2) Date: Sep. 2, 2016

(87) PCT Pub. No.: WO2015/146197
PCT Pub. Date: Oct. 1, 2015

(65) Prior Publication Data
US 2017/0077829 A1    Mar. 16, 2017

(30) Foreign Application Priority Data

Mar. 27, 2014    (JP) .................................. 2014-065520

(51) Int. Cl.
*H02M 5/458*    (2006.01)
*H02M 1/10*    (2006.01)
(Continued)

(52) U.S. Cl.
CPC ............. *H02M 5/458* (2013.01); *H02M 1/10* (2013.01); *H02M 1/12* (2013.01); *H02M 1/14* (2013.01);
(Continued)

(58) Field of Classification Search
CPC ...................................................... H02M 5/458
See application file for complete search history.

(56) References Cited

U.S. PATENT DOCUMENTS

| 6,629,064 B1 | 9/2003 | Wall |
| 2011/0007536 A1 | 1/2011 | Takamatsu et al. |

(Continued)

FOREIGN PATENT DOCUMENTS

| JP | 2002-51589 A | 2/2002 |
| JP | 2005-124298 A | 5/2005 |

(Continued)

OTHER PUBLICATIONS

International Search Report issued in PCT/JP2015/001800, dated Jun. 30, 2015.

(Continued)

*Primary Examiner* — Jue Zhang
*Assistant Examiner* — Trinh Dang
(74) *Attorney, Agent, or Firm* — Birch, Stewart, Kolasch & Birch, LLP

(57) ABSTRACT

Disclosed herein is a power conversion device including a storage and a power conversion controller. The storage stores multiple values, each correlated to a disturbance that causes distortion in a current to a power converter, in association with a phase angle of a voltage of an AC power supply. The power conversion controller controls ON/OFF operations by using the values stored in the storage to compensate for a manipulated variable of control performed (Continued)

by the power converter in association with the phase angle of the voltage of the AC power supply.

20 Claims, 14 Drawing Sheets

(51) Int. Cl.
  *H02M 1/12*  (2006.01)
  *H02M 7/5387*  (2007.01)
  *H02M 7/5395*  (2006.01)
  *H02P 23/26*  (2016.01)
  *H02P 29/50*  (2016.01)
  *H02M 1/14*  (2006.01)
  *H02P 27/08*  (2006.01)
  *H02M 7/48*  (2007.01)
  *H02M 1/00*  (2006.01)

(52) U.S. Cl.
  CPC ..... *H02M 7/5395* (2013.01); *H02M 7/53873* (2013.01); *H02P 23/26* (2016.02); *H02P 27/085* (2013.01); *H02P 29/50* (2016.02); *H02M 7/4826* (2013.01); *H02M 2001/0022* (2013.01); *H02M 2001/0025* (2013.01); *H02P 2205/00* (2013.01)

(56) References Cited

U.S. PATENT DOCUMENTS

| | | | | |
|---|---|---|---|---|
| 2014/0203755 | A1* | 7/2014 | Becerra | H02P 21/24 318/812 |
| 2014/0225545 | A1* | 8/2014 | Becerra | H02P 23/26 318/400.26 |
| 2014/0354208 | A1* | 12/2014 | Kira | H02P 29/025 318/635 |
| 2015/0180401 | A1* | 6/2015 | Chretien | H02P 21/24 318/490 |

FOREIGN PATENT DOCUMENTS

| | | |
|---|---|---|
| JP | 2005-130675 A | 5/2005 |
| JP | 2009-225631 A | 10/2009 |

OTHER PUBLICATIONS

Extended European Search Report dated Oct. 17, 2017 in Patent Application No. 15767771.7.

* cited by examiner

POWER CONVERSION DEVICE WITH REDUCED CURRENT DEVIATION

TECHNICAL FIELD

The present invention relates to a power conversion device.

BACKGROUND ART

In air conditioners, for example, a power conversion device, including a converter circuit and an inverter circuit, is used to supply power to the motor of a compressor. Among such power conversion devices, some exemplary power conversion device attempts to increase the power factor by adopting a capacitor with a small capacitance, which is on the order of one-hundredth of that of a normal smoothing capacitor, as a capacitor provided between the converter circuit and the inverter circuit (such a capacitor will be hereinafter referred to as a "DC link capacitor"). Such a power conversion device is disclosed, for example, in Patent Document 1.

CITATION LIST

Patent Document

PATENT DOCUMENT 1: Japanese Unexamined Patent Publication No. 2002-51589

SUMMARY OF INVENTION

Technical Problem

In such a power conversion device, a reactor is often provided on an input side (i.e., AC side) or output side (i.e., DC side) of the converter circuit. This reactor and the DC link capacitor together form an LC resonant circuit, the resonance of which may cause distortion in the output current or voltage waveform of the converter circuit, i.e., may cause an increase in harmonics. Likewise, even if there are no reactors, the inductance of a power supply system and the capacitor in the power conversion device may also form an LC resonant circuit, which may also cause distortion in current waveform. That is to say, the deviation of a current from a command value thereof increases.

Naturally, such harmonics need to be reduced, but it is not easy to provide an appropriate countermeasure against them. Particularly, the smaller the capacitance of the capacitor forming part of the LC resonant circuit, the higher the LC resonant frequency, and the more difficult it is to take an appropriate countermeasure.

In view of the foregoing background, it is therefore an object of the present invention to reduce the deviation of a current from a command value thereof in a power conversion device.

Solution to the Problem

To overcome this problem, a first aspect of the present invention provides a power conversion device including:

a power converter (13) configured to convert, by performing ON/OFF operations on a plurality of switching elements (Su, Sv, Sw, Sx, Sy, Sz), either an alternating current output from an AC power supply (30) or a direct current converted from the alternating current into a different alternating current having a predetermined frequency and a predetermined voltage;

a capacitor (12a) configured to smooth a ripple voltage generated as a result of the ON/OFF operations;

a storage (62) configured to store multiple values, each correlated to a disturbance that causes distortion in a current (Iin) to the power converter (13), in association with a phase angle ($\theta$in) of a voltage (Vin) of the AC power supply (30); and a power conversion controller (50, 60) configured to control the ON/OFF operations by using the values stored in the storage (62) to compensate for a manipulated variable (iT*) of control performed by the power converter (13) in association with the phase angle ($\theta$in) of the voltage (Vin) of the AC power supply (30).

According to this configuration, the ON/OFF operations of the power converter (13) are performed based on the values stored in the storage (62).

A second aspect of the present invention is an embodiment of the first aspect. In the second aspect, each of the values correlated to the disturbance is selected from the group consisting of:

the current to the power converter (13);

an output current value (|Iin|) of a converter circuit (11) configured to convert an output of the AC power supply (30) into a direct current;

a voltage (vdc) of the capacitor (12a);

an energy (Ce) of the capacitor (12a);

a deviation of the current to the power converter (13) from a command value of the current to the power converter (13);

a deviation of the output current value (|Iin|) of the converter circuit (11) configured to convert the output of the AC power supply (30) into the direct current from a current command (|Iin*|) specifying the output current value (|Iin|);

a deviation of the voltage (vdc) of the capacitor (12a) from a command value (vdc*) of the voltage (vdc) of the capacitor (12a); and a deviation of the energy (Ce) of the capacitor (12a) from a command value (vdc*) of the energy (Ce).

A third aspect of the present invention is an embodiment of the first or second aspect. In the third aspect, the power conversion controller (50, 60) controls a power of the power converter (13) based on the values stored in the storage (62).

According to this configuration, the power of the power converter (13) may be controlled based on the stored values.

A fourth aspect of the present invention is an embodiment of the first or second aspect.

In the fourth aspect, the power conversion controller (50, 60) controls a current at the power converter (13) based on the values stored in the storage (62).

According to this configuration, the current at the power converter (13) may be controlled based on the stored values.

A fifth aspect of the present invention is an embodiment of any one of the first to fourth aspects. In the fifth aspect, the power conversion controller (50, 60) compensates for the manipulated variable (iT*) using the multiple different values correlated to the disturbance.

According to this configuration, the power or current of the power converter (13) may be controlled based on the multiple stored values.

A sixth aspect of the present invention is an embodiment of any one of the first to fifth aspects. In the sixth aspect, if the values stored in the storage (62) are discontinuous, the power conversion controller (50, 60) makes interpolation between the discontinuous values using data stored in the storage (62).

Advantages of the Invention

According to these various aspects described above, the deviation of a current from a command value thereof may be reduced in a power conversion device.

DESCRIPTION OF EMBODIMENTS

Embodiments of the present invention will now be described with reference to the accompanying drawings. Note that the following embodiments are only exemplary ones in nature, and are not intended to limit the scope, application or uses of the present invention.

<<First Embodiment of this Invention>>

Figure 1:
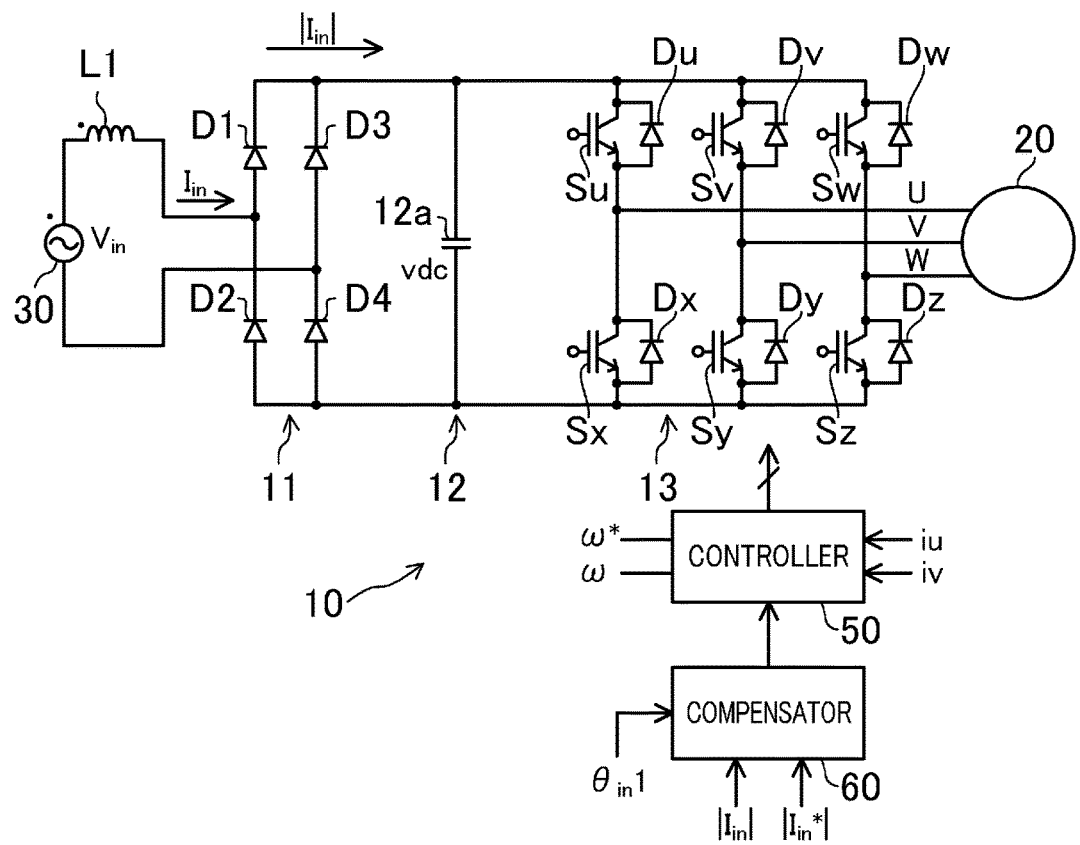
FIG. 1 illustrates a configuration for a power conversion device according to a first embodiment of the present invention.

FIG. 1 illustrates a configuration for a power conversion device (10) according to a first embodiment of the present invention. This power conversion device (10) may be used to supply power to a motor for driving the compressor of an air conditioner (not shown), for example, and other devices.

As shown in FIG. 1, the power conversion device (10) includes a converter circuit (11), a DC section (12), an inverter circuit (13), a controller (50), and a compensator (60). The power conversion device (10) converts AC power supplied from a single-phase AC power supply (30) into AC power having a predetermined frequency and a predetermined voltage, and supplies the converted AC power to a motor (20). The motor (20) is provided to drive the compressor described above and may be a so-called "interior permanent magnet (IPM) motor," for example.

<Converter Circuit>

The converter circuit (11) is connected to the AC power supply (30) via a reactor (L1), and rectifies the alternating current supplied from the AC power supply (30) into a direct current. In this example, the converter circuit (11) is configured as a diode bridge circuit in which four diodes (D1-D4) are connected together to form a bridge. Using these diodes (D1-D4), the converter circuit (11) subjects the AC voltage of the AC power supply (30) to a full-wave rectification, thereby converting the AC voltage into a DC voltage.

<DC Section>

The DC section (12) includes a capacitor (12a), which is connected between the positive and negative output nodes of the converter circuit (11). Thus, a DC voltage generated between the two terminals of the capacitor (12a) (hereinafter referred to as a "DC link voltage (vdc)") is applied to an input node of the inverter circuit (13). If no reactor (L1) is provided closer to the AC power supply than the converter circuit (11) is, then the capacitor (12a) is connected to the positive output node of the converter circuit (11) via another reactor (hereinafter referred to as a reactor (L2)). The reactor (L1) and the capacitor (12a) form an LC resonant circuit. Likewise, the reactor (L2) and the capacitor (12a) also form an LC resonant circuit. Even if no reactors (L1, L2) were provided, an LC resonant circuit would also be formed by an inductance that the power supply system has and the capacitor (12a). The LC resonance produced in this LC resonant circuit may cause distortion in the output current waveform of the converter circuit (11). Thus, in this embodiment, the compensator (60) to be described in detail later provides a countermeasure against the distortion of the output current waveform.

This capacitor (12a) has such a capacitance that allows itself to smooth only a ripple voltage (voltage variation) generated while the switching elements (to be described later) of the inverter circuit (13) are performing a switching operation. That is to say, the capacitor (12a) is a small-capacitance capacitor which does not have such a capacitance that allows itself to smooth the voltage rectified by the converter circuit (11) (i.e., a voltage varying according to the supply voltage). A film capacitor may be used as the capacitor (12a).

Figure 2:
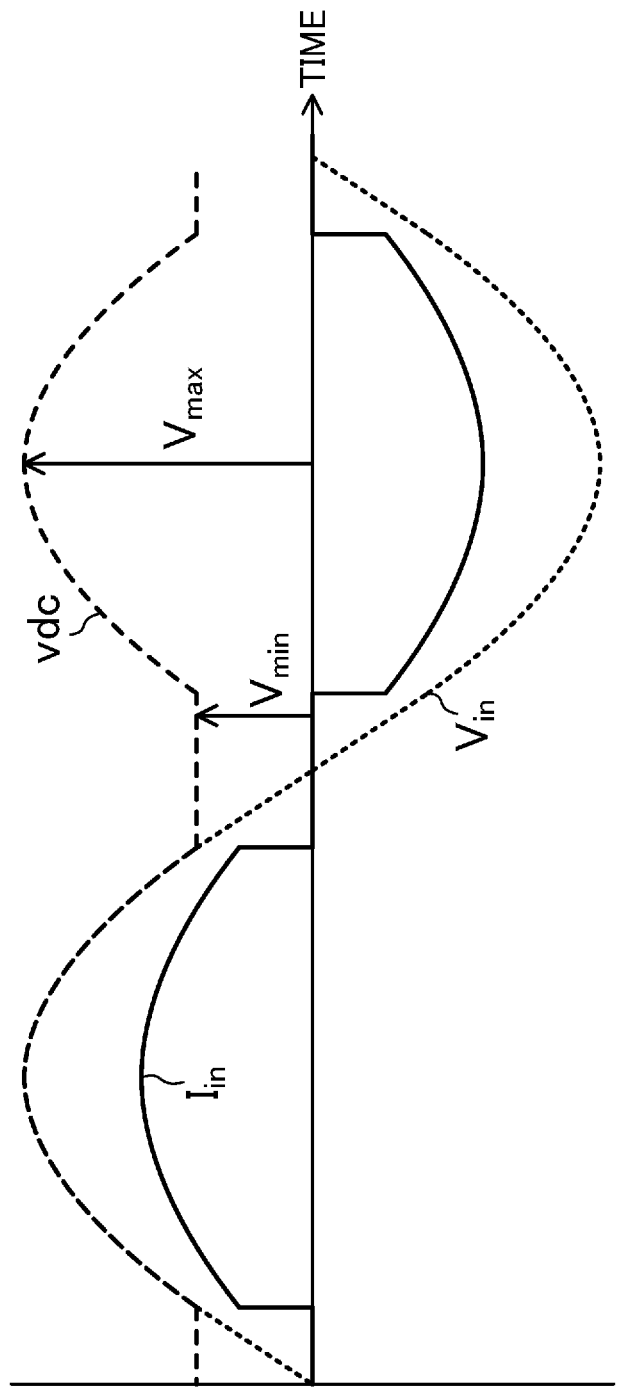
FIG. 2 shows the respective waveforms of a current of an AC power supply, a voltage of the AC power supply, and a DC link voltage.

Since such a small-capacitance capacitor is adopted as the capacitor (12a), the DC link voltage (vdc) pulsates at twice as high a frequency as that of the supply voltage. FIG. 2 shows the respective waveforms of the current of the AC power supply (30), the voltage (Vin) of the AC power supply (30), and the DC link voltage (vdc). In this example, the DC link voltage (vdc) has so large a pulsation that its maximum value (Vmax) becomes twice or more as large as its minimum value (Vmin).

<Inverter Circuit>

The inverter circuit (13) has its input node connected to the capacitor (12a), and is supplied with a pulsating DC voltage (i.e., the DC link voltage (vdc)). By turning the switching elements (to be described later) ON and OFF, the inverter circuit (13) converts the output of the DC section (12) into three-phase alternating currents (U, V, W), and supplies these currents to the motor (20). That is to say, the motor (20) constitutes a load for the inverter circuit (13).

The inverter circuit (13) of this embodiment has a configuration in which each of a plurality of switching elements is bridge-connected. This inverter circuit (13) includes six switching elements (Su, Sv, Sw, Sx, Sy, Sz) in order to output three-phase alternating currents to the motor (20). More specifically, this inverter circuit (13) includes three switching legs in each of which two switching elements are connected together in series. In each switching leg, an intermediate point between the upper-arm switching element (Su, Sv, Sw) and the lower-arm switching element (Sx, Sy, Sz) is connected to the coil of an associated phase of the motor (20). Also, a freewheeling diode (Du, Dv, Dw, Dx, Dy, Dz) is connected anti-parallel to each of these switching elements (Su, Sv, Sw, Sx, Sy, Sz).

By turning these switching elements (Su, Sv, Sw, Sx, Sy, Sz) ON and OFF, the inverter circuit (13) switches the DC link voltage (vdc) supplied from the DC section (12) and converts the DC link voltage (vdc) into a three-phase AC voltage having a predetermined frequency and a predetermined voltage, and supplies the voltage to the motor (20). Such control of the ON/OFF operations is performed by the controller (50). That is to say, the inverter circuit (13) converts the direct current, into which the alternating current supplied from the AC power supply (30) has been converted, into an alternating current having a predetermined frequency and a predetermined voltage, and functions as an exemplary power converter according to the present invention.

<Controller>

Figure 3:
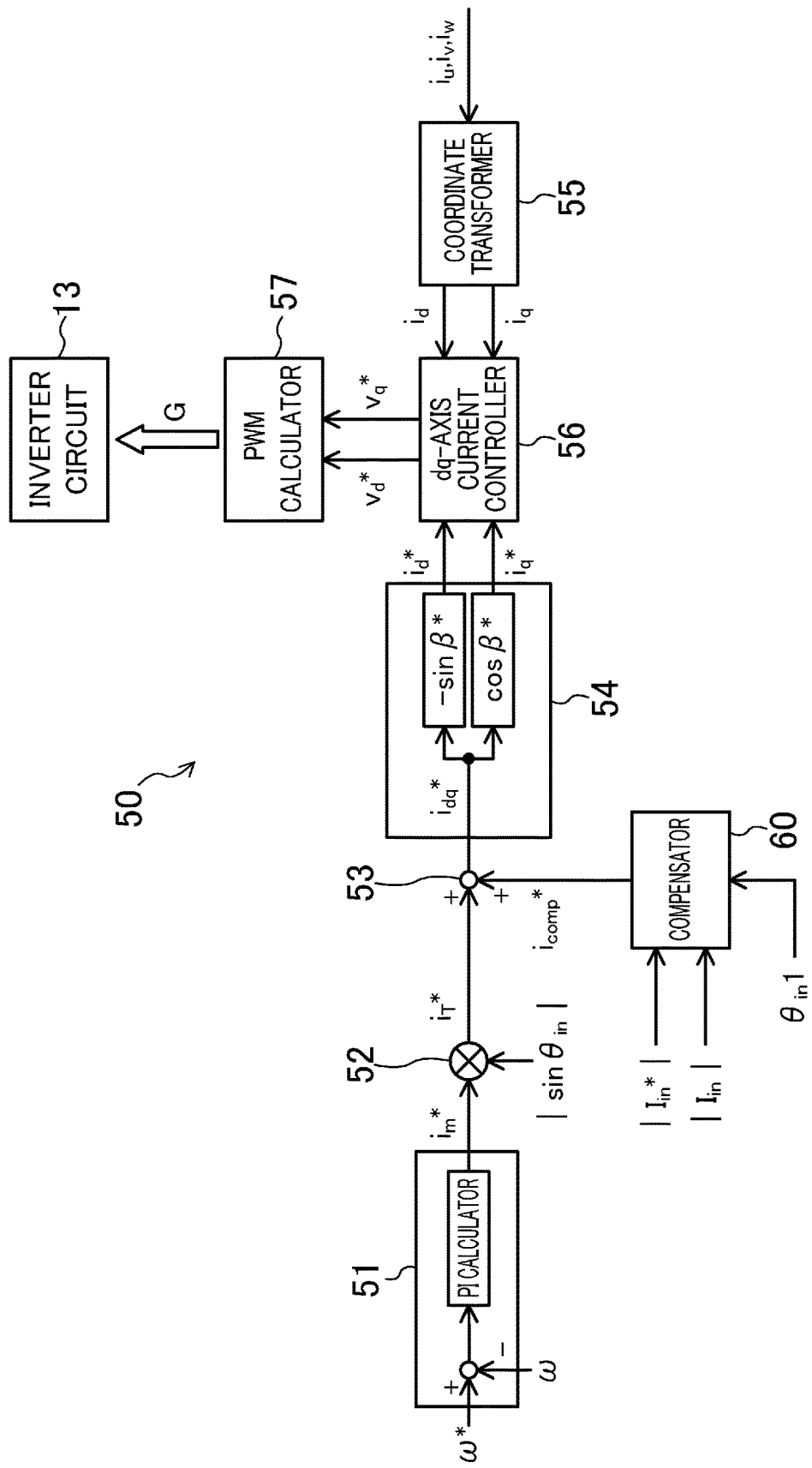
FIG. 3 illustrates a control system for an inverter circuit according to the first embodiment.

FIG. 3 illustrates a control system for the inverter circuit (13) according to the first embodiment. This controller (50) includes a microcomputer (not shown) and a program installed therein to operate the microcomputer. By controlling the ON/OFF operations of the switching elements (Su, Sv, Sw, Sx, Sy, Sz), the controller (50) controls the current of the inverter circuit (13). That is to say, as the output of the inverter circuit (13) is controlled by the controller (50), the drive of the motor (20) is controlled. The drive of the motor (20) may be controlled, for example, by d-q axis vector control. The controller (50) of this embodiment includes a velocity controller (51), a multiplier (52), an adder (53), a dq current command value generator (54), a coordinate transformer (55), a dq axis current controller (56), and a PWM calculator (57).

The velocity controller (51) calculates the deviation of the rotational angular frequency (ω) of the mechanical angle of the motor (20) from the command value (ω*) of the mechanical angle. Then, the velocity controller (51) performs proportional integral (PI) operation on the deviation and outputs a result of the operation as a first current command value (im*) to the multiplier (52).

The multiplier (52) multiplies together the absolute value of the sine value (|sin(θin)|) of the phase angle (θin) of the voltage (Vin) at the AC power supply (30) and the first current command value (im*), and outputs a result of the multiplication as a second current command value (iT*). This second current command value (iT*) is a motor current amplitude command value, and is an exemplary manipulated variable of the control to be performed by the power converter in accordance with the present invention.

The adder (53) adds together the second current command value (iT*) and a compensation current command value (icomp*) (to be described later) generated by the compensator (60), and outputs a result of the addition (hereinafter referred to as a "drive current command value (idq*)") to the dq current command value generator (54).

The dq current command value generator (54) calculates a d-axis current command value (id*) and a q-axis current command value (iq*) based on the drive current command value (idq*) and the command value (β*) of the phase (β) of the current to flow through the motor (20), and outputs them to the dq axis current controller (56). Specifically, the dq current command value generator (54) generates a d-axis current command value (id*) by multiplying the sine value (−sin β*) of the command value (β*) and the drive current command value (idq*) together, and also generates a q-axis current command value (iq*) by multiplying the cosine value (cos β*) of the command value (β*) and the drive current command value (idq*) together.

The coordinate transformer (55) calculates a d-axis current value (id) and a q-axis current value (iq) based on the angle of rotation (which is an electrical angle (θe)) of the rotor (not shown) of the motor (20) and phase currents (iu, iv, iw) of the inverter circuit (13).

The dq axis current controller (56) generates a d-axis voltage command value (Vd*) and a q-axis voltage command value (Vq*) so as to reduce the deviation of the d-axis current value (id) from the d-axis current command value (id*) and the deviation of the q-axis current value (iq) from the q-axis current command value (iq*), respectively, and outputs these voltage command values to the PWM calculator (57).

The PWM calculator (57) receives the d-axis and q-axis voltage command values (Vd*, Vq*), the DC link voltage (vdc), and the electrical angle (θe). Based on these values, the PWM calculator (57) generates a control signal (G) (hereinafter also referred to as a "PWM output") to control the ON/OFF operations of the respective switching elements (Su, Sv, Sw, Sx, Sy, Sz) of the inverter circuit (13) and outputs the control signal (G) to the inverter circuit (13). The PWM output (G) is updated on a predetermined period (hereinafter referred to as a "carrier period (Tc)" or an update period (Tc)") basis.

<Compensator>

Figure 4:
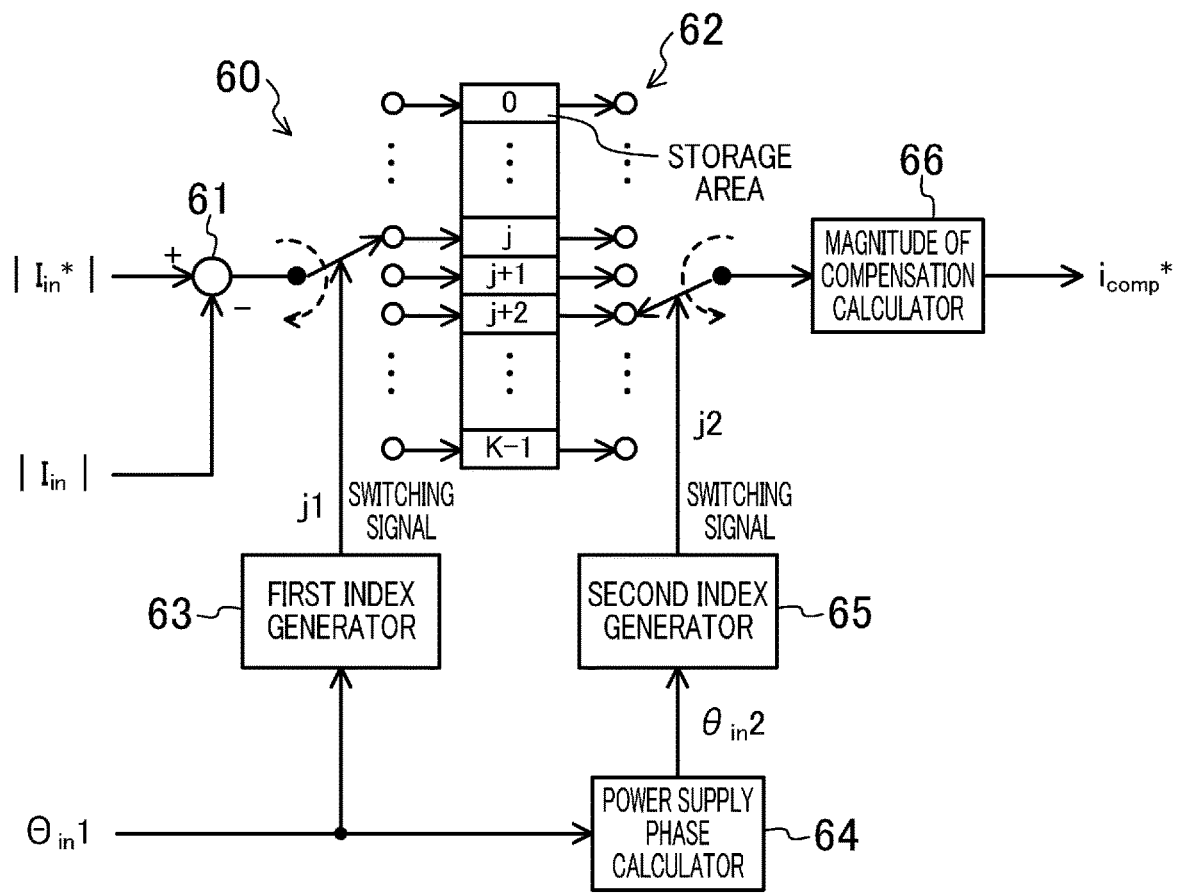
FIG. 4 illustrates an exemplary configuration for a compensator.

The compensator (60) generates a compensation current command value (icomp*) to compensate for (as will be described later) the second current command value (iT*). In this example, the controller (50) and the compensator (60) together form an exemplary power conversion controller according to the present invention. The compensator (60) includes a microcomputer (not shown) and a program installed therein to operate the microcomputer. FIG. 4 shows an exemplary configuration for the compensator (60). As shown in FIG. 4, this compensator (60) includes a subtractor (61), a deviation storage (62), a first index generator (63), a power supply phase calculator (64), a second index generator (65), and a magnitude of compensation calculator (66).

—Subtractor (61)—

The subtractor (61) calculates the deviation of the output current value (|Iin|) of the converter circuit (11) from a current command (|Iin*|) specifying the output current value (|Iin|). This deviation is correlated to a disturbance that causes distortion in a current to the inverter circuit (13) (i.e., the output current value (|Iin|)). That is to say, this deviation is an exemplary value correlated to a disturbance that causes distortion in a current (Iin) to the power converter. Note that the current value (|Iin|) is a measured value. Also, the current command (|Iin*|) is generated as the product of the amplitude of the fundamental wave component of the input current value (Iin) of the converter circuit (11) and | sin(θin)|.

—Deviation Storage (62)—

The deviation storage (62) has a plurality (or an arrangement) of storage areas and stores the deviations calculated by the subtractor (61). This deviation storage (62) is an exemplary storage according to the present invention. The number (hereinafter referred to as "K") of the storage areas in the deviation storage (62) is set such that a period (hereinafter referred to as a storage period (Tm)) corresponding to $\pi/K$ [rad] of one voltage period of the AC power supply (30) (hereinafter referred to as a "power supply period") becomes equal to or shorter than one carrier period (Tc). If K is set as described above, the deviation storage (62) is allowed to store K deviations in a period corresponding to a half of one power supply period (hereinafter referred to as a "power supply half period"). In this embodiment, one storage period (Tm) agrees with one carrier period (Tc).

—First Index Generator (63)—

The first index generator (63) calculates an index (idx) specifying any of the storage areas of the deviation storage (62) based on the phase angle ($\theta$in)=$\theta$in1 when the control processing (such as current control) is started. In this example, idx=$\theta$in1/($\pi$/K) is supposed to be satisfied. Thus, the index (idx) falls within the range of 0 to K−1.

In the deviation storage (62), the deviation at the phase angle ($\theta$in1) is stored in a storage area associated with the index (idx) calculated. That is to say, the deviation storage (62) stores multiple deviations of the output current values (|Iin|) from the current command (|Iin*|) in association with the phase angle ($\theta$in) of the voltage (Vin) of the AC power supply (30). Since the index (idx) and the phase angles ($\theta$in) are associated with each other as described above, multiple values (i.e., deviations) correlated to the disturbance to the intervals of the storage periods (Tm) are stored side by side in the deviation storage (62).

—Power Supply Phase Calculator (64)—

The power supply phase calculator (64) calculates the phase angle ($\theta$in2) at the timing of compensating for the second current command value (iT*). In this example, the power supply phase calculator (64) outputs, based on the phase angle ($\theta$in1) at the starting point of control processing (such as current control), the phase angle ($\theta$in2) at the endpoint of an update period (Tc) to which the output of the control processing is applied as a PWM signal.

—Second Index Generator (65)—

The second index generator (65) calculates, based on the phase angle ($\theta$in)=$\theta$in2 obtained by the power supply phase calculator (64), an index (idx) specifying any of the storage areas of the deviation storage (62). The index (idx) may be calculated in the same way as in the first index generator (63), and idx=$\theta$in2/($\pi$/K) is supposed to be satisfied.

—Magnitude of Compensation Calculator (66)—

The magnitude of compensation calculator (66) calculates a compensation current command value (icomp*). Specifically, using the index (idx) calculated by the second index generator (65), the magnitude of compensation calculator (66) retrieves a deviation from any of the storage areas of the deviation storage (62). In the following description, the deviation retrieved will be identified herein by Iin_err. Then, the magnitude of compensation calculator (66) calculates the compensation current command value (icomp*) by icomp*=Gp×Iin_err, where Gp is a gain which may be determined appropriately by experiments, for example. The compensation current command value (icomp*) thus calculated is output to the adder (53) of the controller (50). In this embodiment, the magnitude of compensation calculator (66) and the adder (53) together form a current command compensator.

<How Power Conversion Device Operates>

Figure 5:
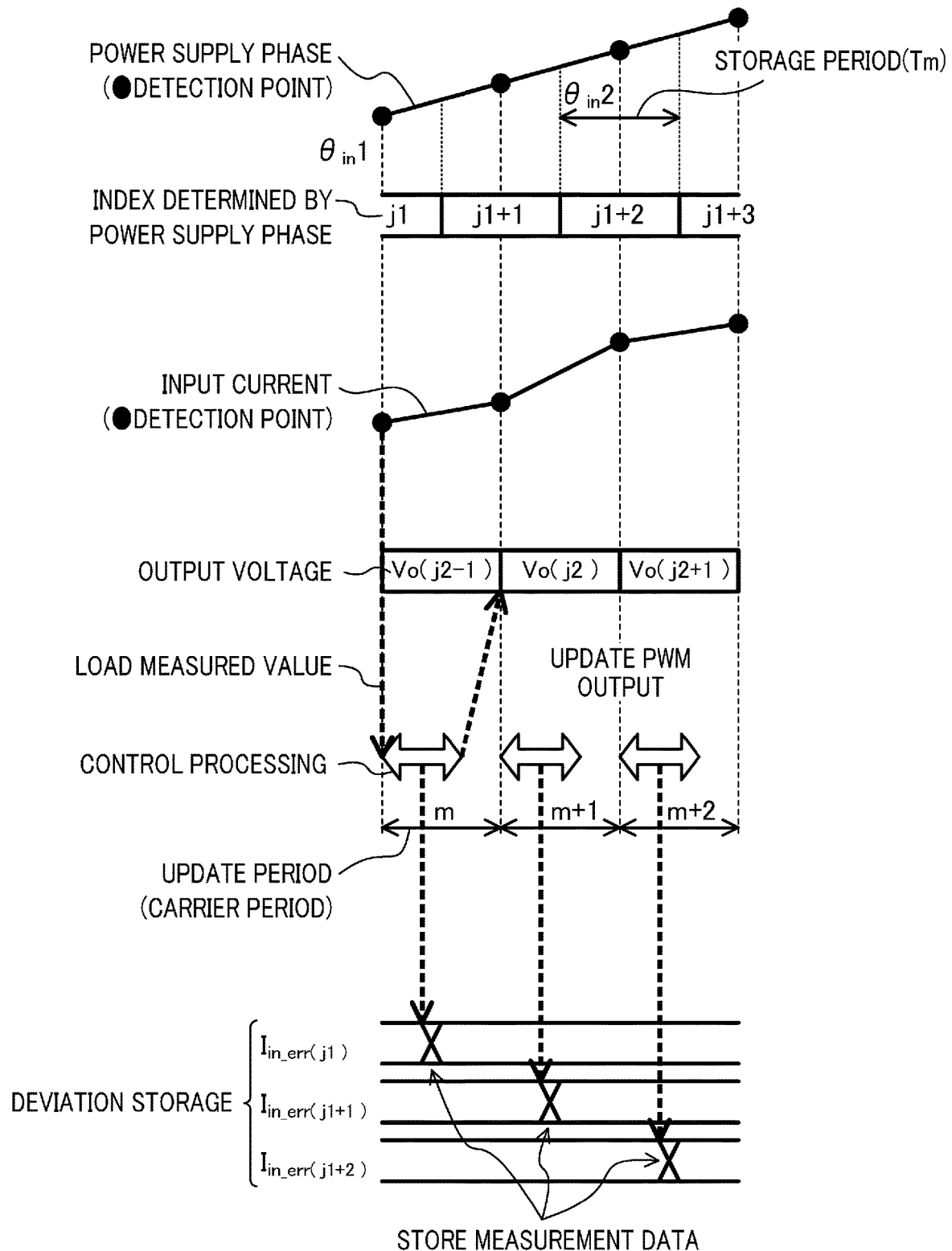
FIG. 5 shows how the compensator performs its compensation operation.
Figure 6:
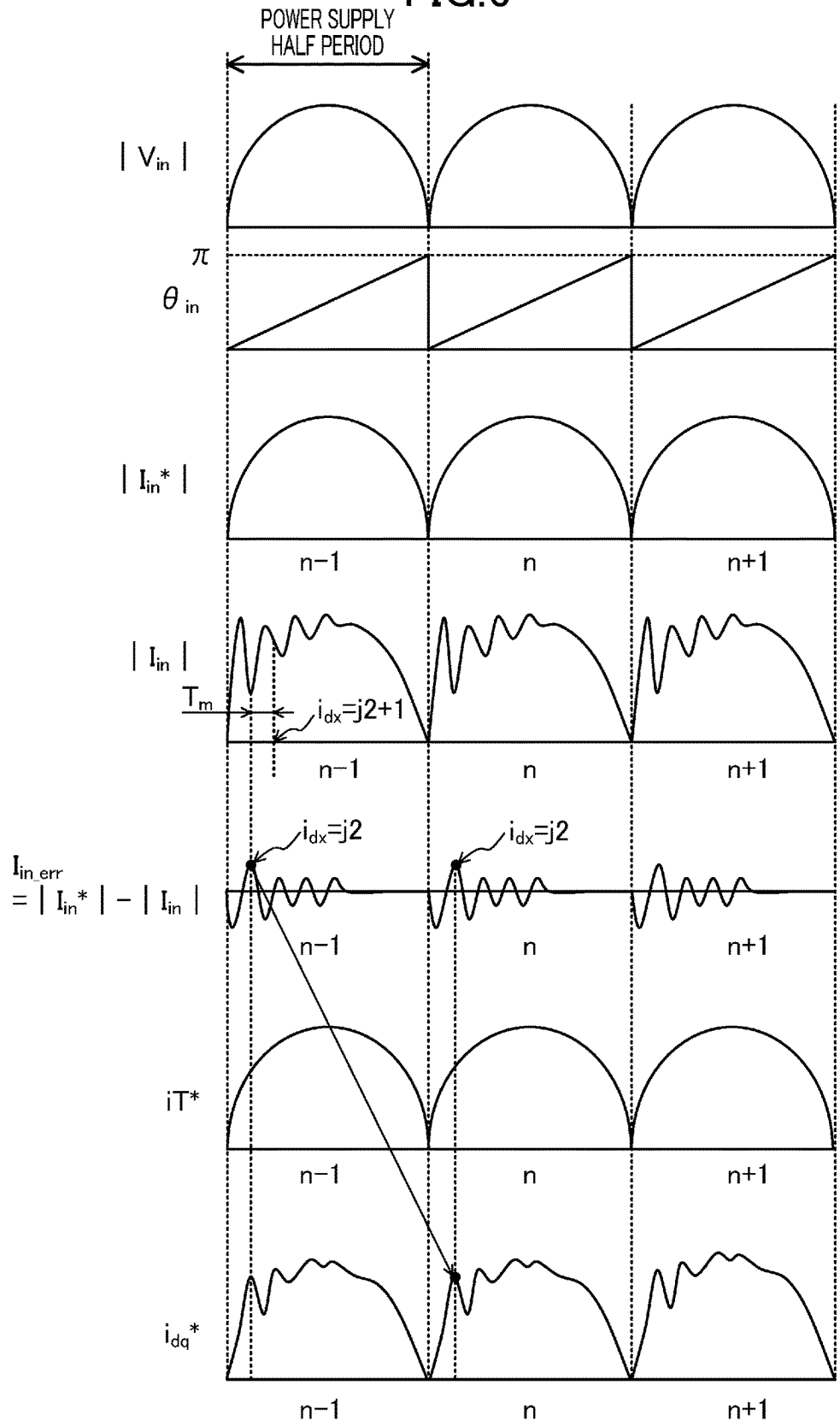
FIG. 6 shows the respective waveforms of a supply voltage, a phase angle, a current command value, an output current value, a deviation, a second current command value, and a drive current command value.

FIG. 5 shows how the compensator (60) performs its compensation operation. In FIG. 5, shown are $m^{th}$ through $(m+2)^{th}$ carrier periods (Tc), where m is an integer equal to or greater than zero. Meanwhile, FIG. 6 shows the respective waveforms of a supply voltage (Vin), a phase angle ($\theta$in), a current command (|Iin*|), an output current value (|Iin|), a deviation (Iin_err), a second current command value (iT*), and a drive current command value (idq*). In FIG. 6, shown are the waveforms in three power supply half periods (i.e., from $(n-1)^{th}$ through $(n+1)^{th}$ power supply half periods).

When a carrier period (Tc) begins, the controller (50) starts performing the control processing. For example, when the control processing for the $m^{th}$ carrier period (Tc) starts, the controller (50) measures the output current value (|Iin|) and the phase angle ($\theta$in). Then, in the controller (50), the velocity controller (51) generates a first current command value (im*) based on the deviation of the rotational angular frequency ($\omega$) from a command value ($\omega$*) thereof. The first current command value (im*) is modulated by the multiplier (52) and then output as the second current command value (iT*).

Meanwhile, in the compensator (60), the second index generator (65) calculates an index (idx) based on the phase angle ($\theta$in1) detected. In this case, the value calculated is supposed to be idx=j2. Then, the magnitude of compensation calculator (66) retrieves a deviation (hereinafter identified by Iin_err(j2)) associated with the index (idx)=j2 thus calculated from the deviation storage (62). The magnitude of compensation calculator (66) calculates the compensation current command value (icomp*) using the deviation Iin_err (j2) thus retrieved.

This compensation current command value (icomp*) is added by the adder (53) to (and compensates for) the second current command value (iT*). In this manner, the second current command value (iT*) is compensated for such that the distortion caused in the output current (Iin) due to the deviation (correlated to the disturbance) of the output current value (|Iin|) from the current command (|Iin*|) is reduced. The second current command value (iT*) thus corrected is output as a drive current command value (idq*) to the dq current command value generator (54).

In this case, the deviation (Iin_err) used to calculate the compensation current command value (icomp*) is that of a power supply half period (n−1) preceding the present power supply half period (n). That is to say, the second current command value (iT*) in the phase corresponding to the index (idx)=j2 of the $n^{th}$ power supply half period is compensated for based on the deviation Tin err(j2) stored in the phase corresponding to the index (idx)=j2 of the $(n-1)^{th}$ power supply half period (see FIG. 6). In FIG. 6, a situation where gain (Gp)=1is illustrated as an example.

As can be seen, in the controller (50), the dq current command value generator (54) generates a d-axis current command value (id*) and a q-axis current command value (iq*) using the drive current command value (idq*) that is the compensated second current command value (iT*). Then, the dq axis current controller (56) generates a d-axis voltage command value (Vd*) and a q-axis voltage command value (Vq*). When the d-axis voltage command value (Vd*) and q-axis voltage command value (Vq*) are generated, the PWM calculator (57) outputs a control signal (G) to the inverter circuit (13). In response, the inverter circuit (13) operates so as to reduce the distortion of the output current waveform of the converter circuit (11). The LC resonance produced by the capacitor (12a) and the reactors (L1, L2) may be reduced in this manner based on the stored deviation (i.e., a value correlated to the disturbance), because the LC resonance has a steady-state repetitive waveform.

Meanwhile, in the compensator (60), the deviation storage (62) updates, based on a disturbance detected every carrier period (Tc), the storage area to store the disturbance. For example, in the $m^{th}$ carrier period (Tc), when finishing outputting the compensation current command value (icomp*), the compensator (60) updates the data stored in the deviation storage (62) based on the output current value (|Iin|) and phase angle (θin1) which were detected when the $m^{th}$ carrier period (Tc) began. Specifically, the first index generator (63) calculates an index based on the phase angle (θin1). In this example, idx=j1. As a result, in the compensator (60), the $j1^{th}$ deviation Iin_err(j1) is updated.

The same operation is performed in the $(m+1)^{th}$ carrier period (Tc) as well. In the $(m+1)^{th}$ carrier period (Tc), idx=j1+1 is satisfied, because the storage period (Tm) agrees with the carrier period (Tc). In the $(m+1)^{th}$ carrier period (Tc), supposing the present power supply half period is the $n^{th}$ one, the second current command value (iT*) in a phase corresponding to the index (idx)=j2+1 of the $n^{th}$ power supply half period is compensated for based on the deviation Iin_err(j2+1) stored in the phase corresponding to the index (idx)=j2+1 of the $(n-1)^{th}$ power supply half period. Also, in the $(m+1)^{th}$ carrier period (Tc), the $(j2+1)^{th}$ deviation Iin_err (j2+1) is updated.

In the embodiment described above, the index (idx) is calculated based on the phase angle (θin) when the control processing is started in each carrier period (Tc). The output current value (|Iin|) is also detected at the starting point of the control processing. If the carrier period (Tc) agrees with the storage period (Tm) as in this embodiment, the index (idx) is updated synchronously with the start of the control processing, and the index increments one by one every control period. Thus, every data in the deviation storage (62) is updated without exception every power supply half period.

<Advantages of This Embodiment>

According to the embodiment described above, deviations (i.e., values correlated to a disturbance) are stored, and the manipulated variable (iT*) of current control of the inverter circuit (13) is compensated for based on the value stored a power supply half period ago. Thus, according to this embodiment, the deviation of a current from a command value thereof may be reduced. More specifically, the distortion of the output current of the converter circuit (11) (i.e., the distortion of an input current to the inverter circuit (13)) caused by a disturbance with a repetitive waveform such as LC resonance may be reduced easily. In addition, the smaller the capacitance of the capacitor forming part of an LC resonant circuit is, the more effectively this method is applicable. The smaller the capacitance of the capacitor forming part of an LC resonance circuit, the higher the frequency of the LC resonance circuit, and the more speedily the compensation operation needs to be done. According to this embodiment, the compensated value is obtained based on the stored deviations, and therefore, the compensation may be done speedily.

<<Variation of First Embodiment>>

Figure 7:
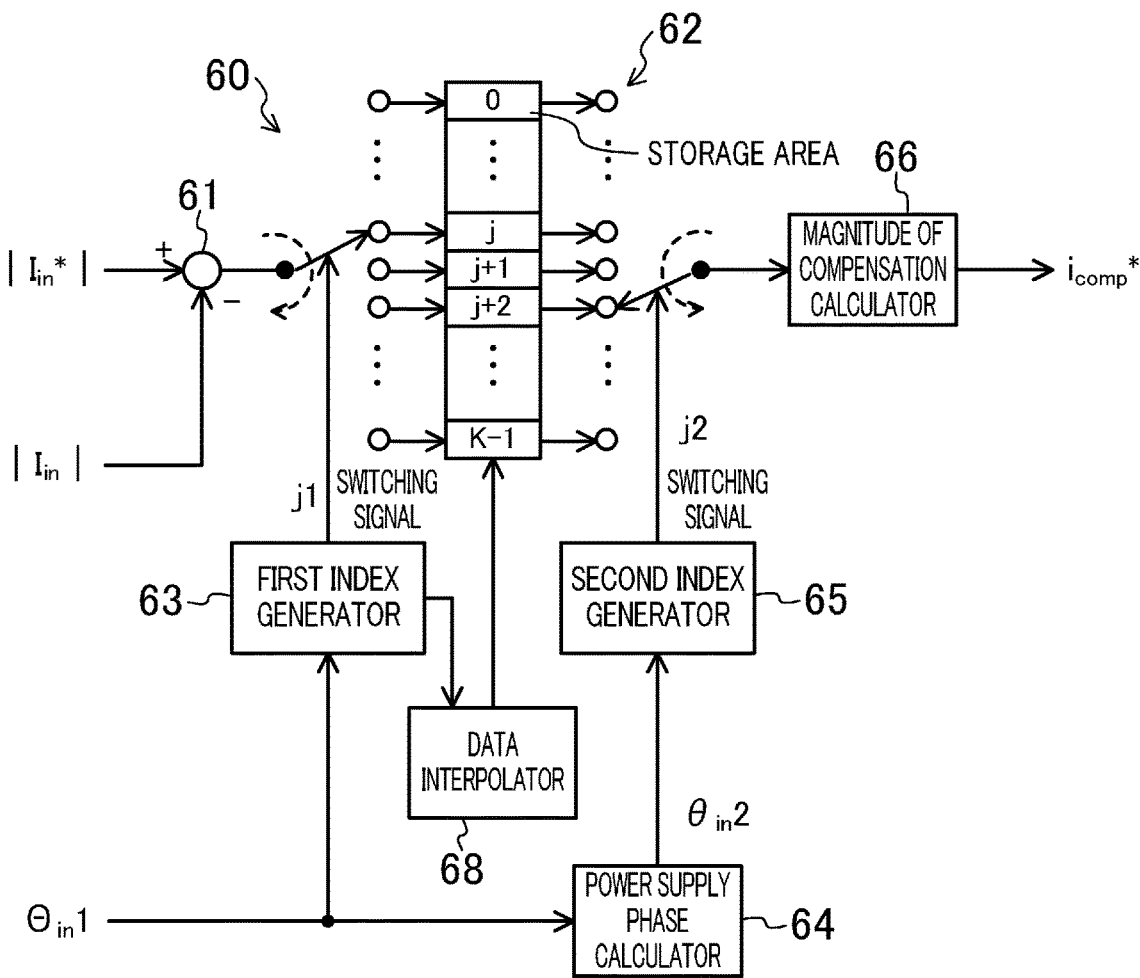
FIG. 7 illustrates a configuration for a compensator according to a variation of the first embodiment.

An example in which one storage period (Tm) is set to be shorter than one carrier period (Tc) will be described as a variation of the first embodiment. FIG. 7 illustrates a configuration for a compensator (60) according to such a variation of the first embodiment. As shown in FIG. 7, the compensator (60) of this variation includes not only all components of the compensator (60) of the first embodiment but also an additional data interpolator (68) as well.

Figure 8:
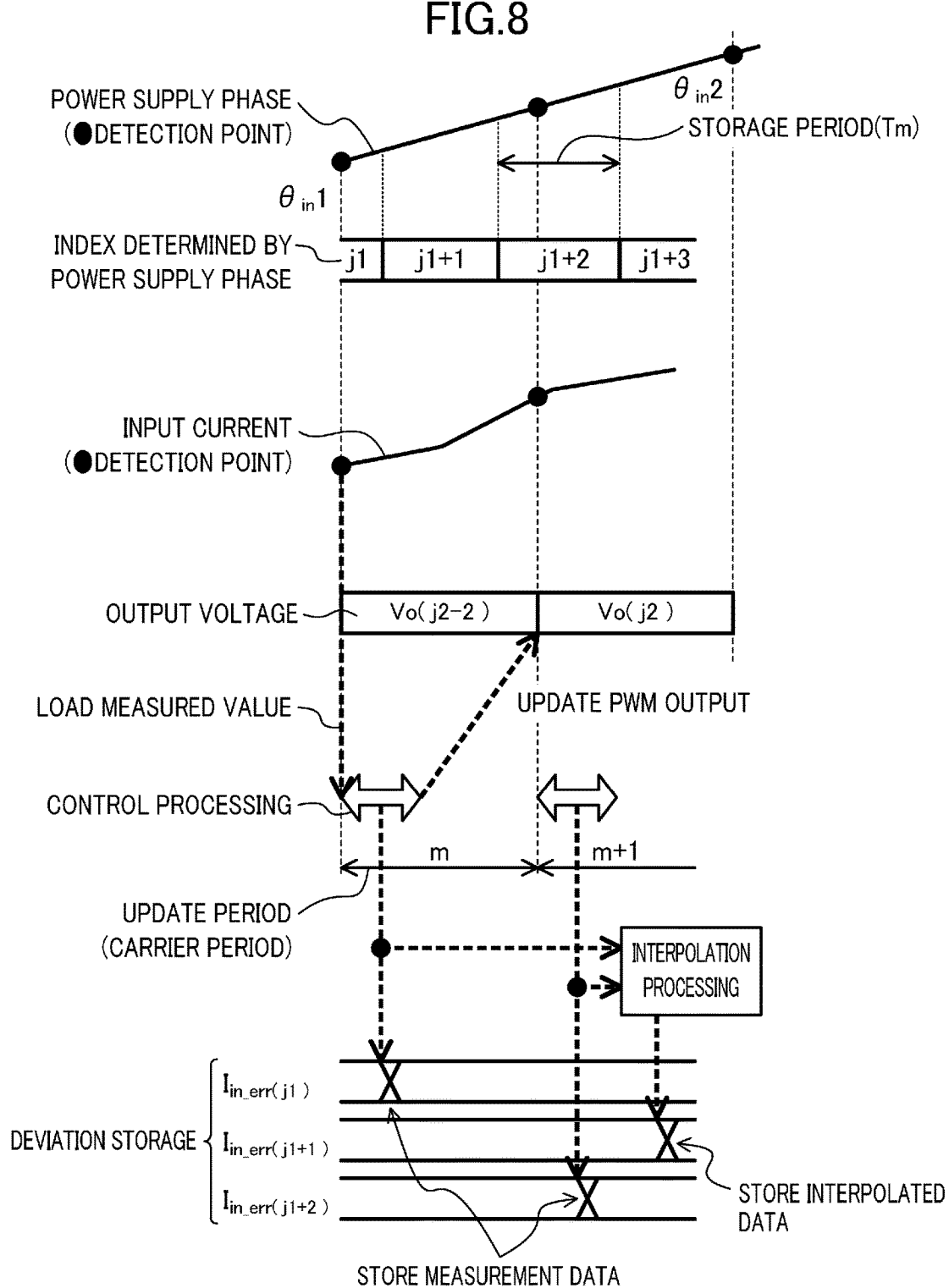
FIG. 8 shows how to update a deviation storage in a situation where one storage period is shorter than one carrier period.

FIG. 8 shows how to update the deviation storage (62) in a situation where one storage period (Tm) is shorter than one carrier period (Tc). In FIG. 8, shown are $m^{th}$ and $(m+1)^{th}$ carrier periods (Tc), where m is an integer equal to or greater than zero. As shown in FIG. 8, if one storage period (Tm) is shorter than one carrier period (Tc), the index (idx) is updated asynchronously with the start of the control processing.

Thus, in two consecutive carrier periods (Tc), the index (idx) may increase by two. In the example shown in FIG. 8, the index (idx) when the $m^{th}$ carrier period (Tc) begins is j1, and the index (idx) when the $(m+1)^{th}$ carrier period (Tc) begins is j1+2. Supposing a disturbance detected every carrier period (Tc) is used to update the storage areas, if the index (idx) has increased by two in this manner, then the data stored in the storage area associated with the index (idx)=j1+1 will not be updated. That is to say, unless the storage areas of the deviation storage (62) are updated sequentially and continuously from the top, there may be some non-updated storage areas left in some cases. Thus, in this variation, the data interpolator (68) is made to sense that the index has increased by two or more and to make interpolation between the data in the non-updated storage areas using the deviations obtained last time and the deviations obtained this time.

In the example shown in FIG. 8, in the $m^{th}$ carrier period (Tc), the storage area (idx=j1) to store the disturbance detected in this carrier period (Tc) is updated. Next, when the control processing for the $(m+1)^{th}$ carrier period (Tc) is started, the first index generator (63) calculates the index (idx)=j1+2. Then, the deviation Iin_err(j1+2) is stored in the storage area associated with that index (idx)=j1+2 (see FIG. 8).

Subsequently, the data interpolator (68) compares the present index (idx)=j1+2 to the index (idx)=j1 that has been calculated in the previous carrier period (Tc), i.e., the $m^{th}$ carrier period (Tc). It can be seen that since the index (idx) has increased in this example by two from that of the previous carrier period (Tc), the data associated with the index (idx)=j1 +1 has not been updated. Thus, the data interpolator (68) generates data associated with the index (idx)=j1+1 by making interpolation between the data associated with the index (idx) =j1 and the data associated with the index (idx)=j1+2, and stores the data thus generated in the deviation storage (62). As can be seen, according to this variation, if the values stored in the storage (62) are discontinuous (i.e., if there is any storage area in which the data has not been updated), that discontinuous interval (i.e., the storage area in which the data has not been updated) is interpolated based on the data stored in the storage (62).

According to this variation, such interpolation processing may prevent the deviation storage (62) from having any storage area which is not updated for a long time. That is to say, according to this variation, even if the storage period (Tm) is asynchronous with the carrier period (Tc), the distortion of the output current of the converter circuit (11) may still be reduced with more reliability. In other words, the deviation of a current from a command value thereof may also be reduced according to this variation.

Note that even if the index (idx) increases by three or more in two consecutive carrier periods (Tc), the data stored in a non-updated storage area may also be updated in the same way as described above based on the data stored in an updated storage area.

<<Second Embodiment of This Invention>>

Figure 9:
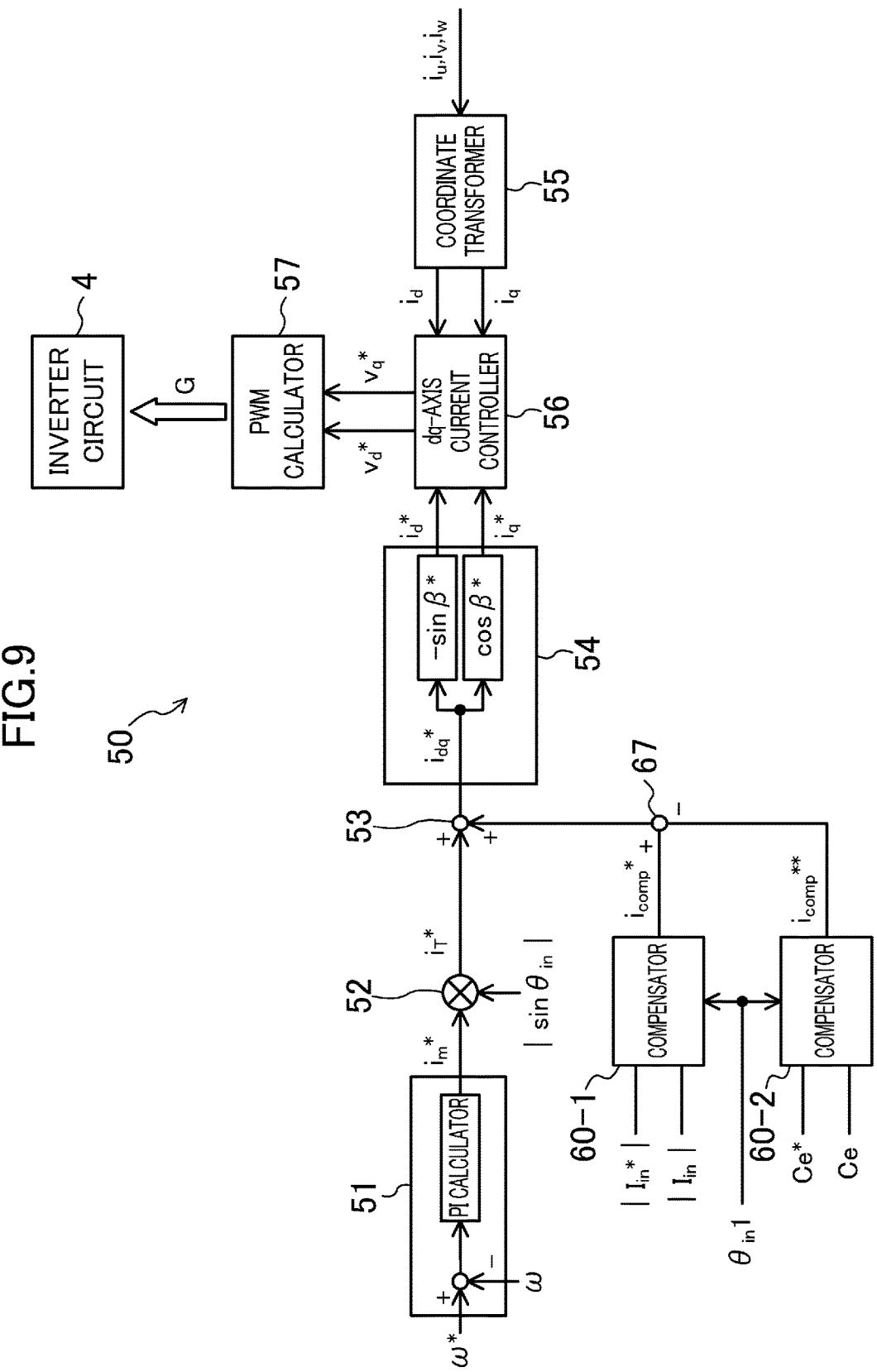
FIG. 9 illustrates a control system for an inverter circuit according to a second embodiment.

FIG. 9 illustrates a control system for an inverter circuit (13) according to a second embodiment. In this embodiment, another compensator (60) and a subtractor (67) are added as shown in FIG. 9 to the control system of the first embodiment. The additional compensator (60) also has the same configuration as the compensator (60) of the first embodiment. However, a different signal is input to the additional compensator (60) from the one input to the compensator (60) of the first embodiment. In FIG. 9, these two compensators (60) are respectively identified by reference signs with two different branch numbers (−1, −2). In this example, the original compensator is identified by (60-1) and the additional compensator is identified by (60-2).

In the additional compensator (60-2), the subtractor (61) calculates the deviation of capacitor energy (Ce) from a command value (Ce*) of the capacitor energy (Ce). Specifically, the subtractor (61) subtracts the capacitor energy (Ce) from the command value (Ce*) and outputs the difference thus obtained as the deviation. In this case, the capacitor energy (Ce) is energy stored in the capacitor (12a) of the DC section (12). This value may be calculated based on the DC link voltage (vdc). Also, the command value (Ce*) is its command value and calculated based on a target value of the DC link voltage (vdc). The target value of the DC link voltage (vdc) is defined such that the DC link voltage (vdc) has a substantially sinusoidal waveform.

In the deviation storage (62) of the additional compensator (60-2), the deviation of the capacitor energy (Ce) from the command value (Ce*) thereof is stored in association with the phase angle (θin) of the voltage (Vin) of the AC power supply (30). This deviation is also an exemplary value correlated to a disturbance that causes distortion in the current (Iin) to the power converter according to the present invention.

Then, the compensation current command value (icomp**) obtained by the additional compensator (60-2) is subtracted by the subtractor (67) from the output of the original compensator (60-1). The output of the subtractor (67) is supplied as a compensated value of the second current command value (iT*) to the adder (53). In this example, these two compensators (60-1, 60-2) and the adder (53) together form a current command value compensator.

With such a configuration adopted, according to this embodiment, the compensation is made based on not only the output current value (|Iin|) of the converter circuit (11) but also the capacitor energy (Ce) stored in the capacitor (12a) of the DC section (12). Such additional compensation based on the capacitor energy (Ce) may reduce the disturbance to be caused by input and output currents of the capacitor (12a) in the DC section, and may bring the output current value (|Iin|) of the converter circuit (11) even closer to the current command (|Iin*|).

Specifically, according to this embodiment, if the capacitor energy (Ce) of the DC section (12) is greater than the command value (Ce*) of the capacitor energy, the second current command value (iT*) is compensated for such that the output power of the inverter circuit (13) is further increased. On the other hand, if the capacitor energy (Ce) is less than the command value (Ce*), the second current command value (iT*) is compensated for such that the output power of the inverter circuit (13) is further decreased.

As can be seen from the foregoing description, according to this embodiment, the compensated value is obtained based on the stored deviations (i.e., values correlated to a disturbance), and therefore, the compensation may be done speedily.

<<Third Embodiment of This Invention>>

Figure 10:
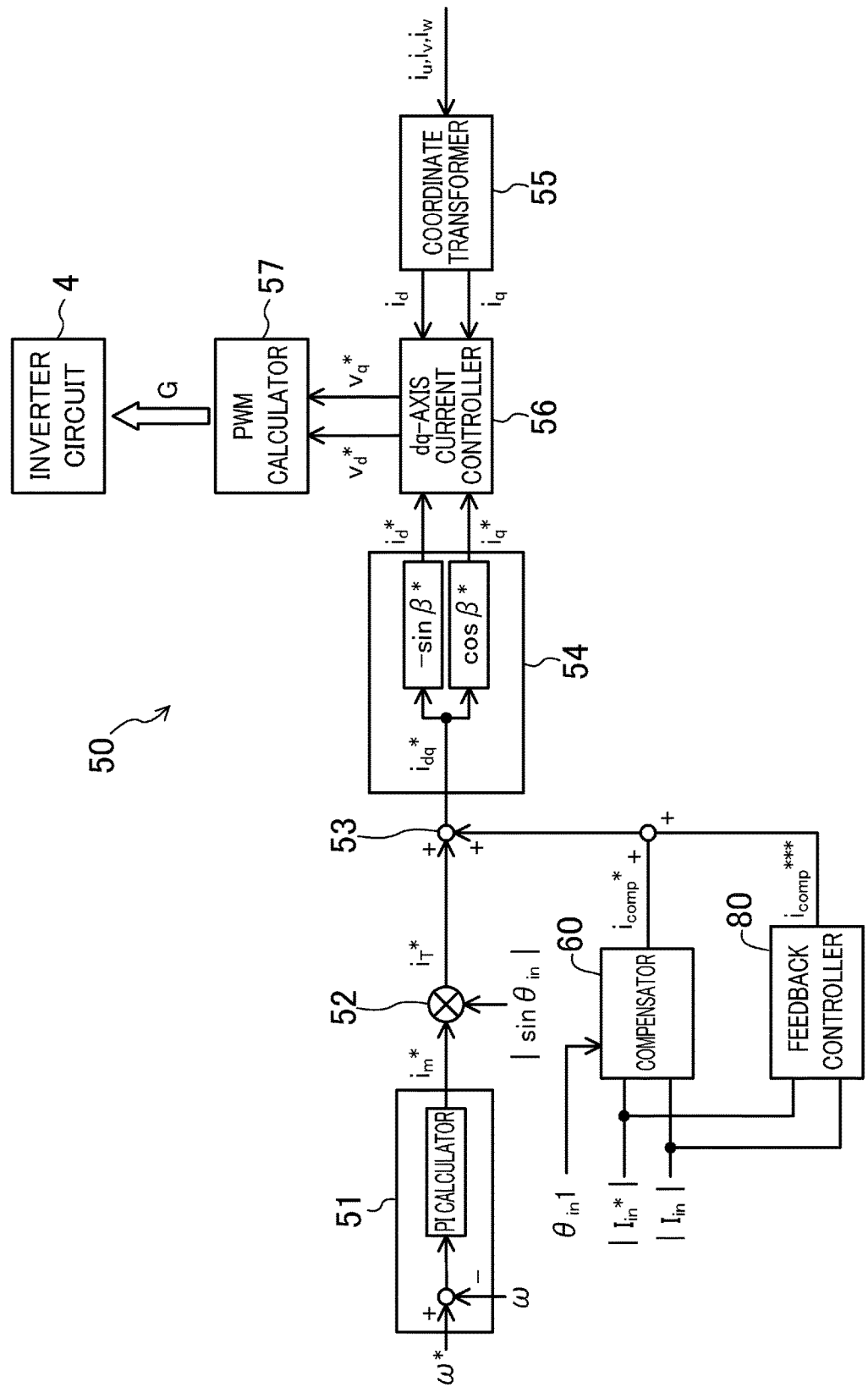
FIG. 10 illustrates a control system for an inverter circuit according to a third embodiment.

FIG. 10 illustrates a control system for an inverter circuit (13) according to a third embodiment. In this example, a feedback controller (80) is added to the control system of the first embodiment. The feedback controller (80) compensates for the current command (|Iin*|) by performing feedback control such that the deviation of the output current value (|Iin|) from the current command (|Iin*|) decreases.

Figure 11:
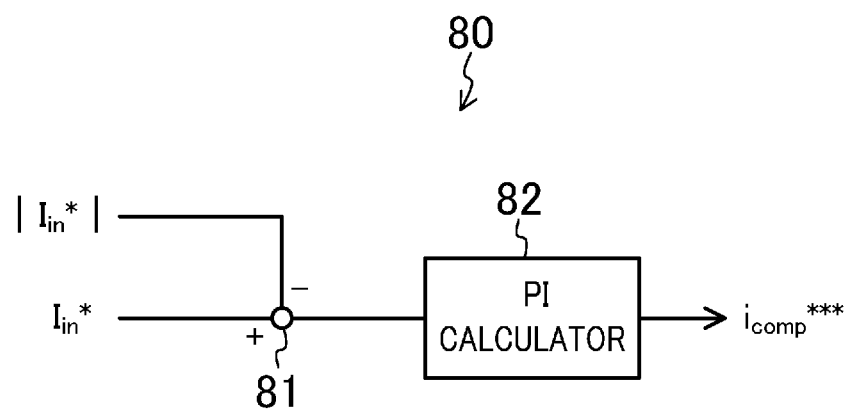
FIG. 11 illustrates an exemplary configuration for a feedback controller.

FIG. 11 illustrates an exemplary configuration for the feedback controller (80). As shown in FIG. 11, the feedback controller (80) includes a subtractor (81) and a PI calculator (82). The subtractor (81) calculates the deviation of the output current value (|Iin|) from a current command (|Iin*|) thereof. The PI calculator (82) performs a proportional integral (PI) operation on the output of the subtractor (81) and outputs a result of the operation as a compensation current command value (icomp***), which is then added to the output of the compensator (60). The sum is input to the adder (53) of the controller (50).

With this feedback controller (80) provided, the distortion caused in the output current of the converter circuit (11) due to not only a steady-state disturbance such as the LC resonance mentioned above but also a non-steady-state disturbance may be reduced. Note that appropriate adjustment of the balance between the gain (Gp) of the compensator (60) and the gain of the feedback controller (80) may prevent the control by the feedback controller (80) from affecting the control by the compensator (60) excessively.

<<Fourth Embodiment of This Invention>>

Figure 12:
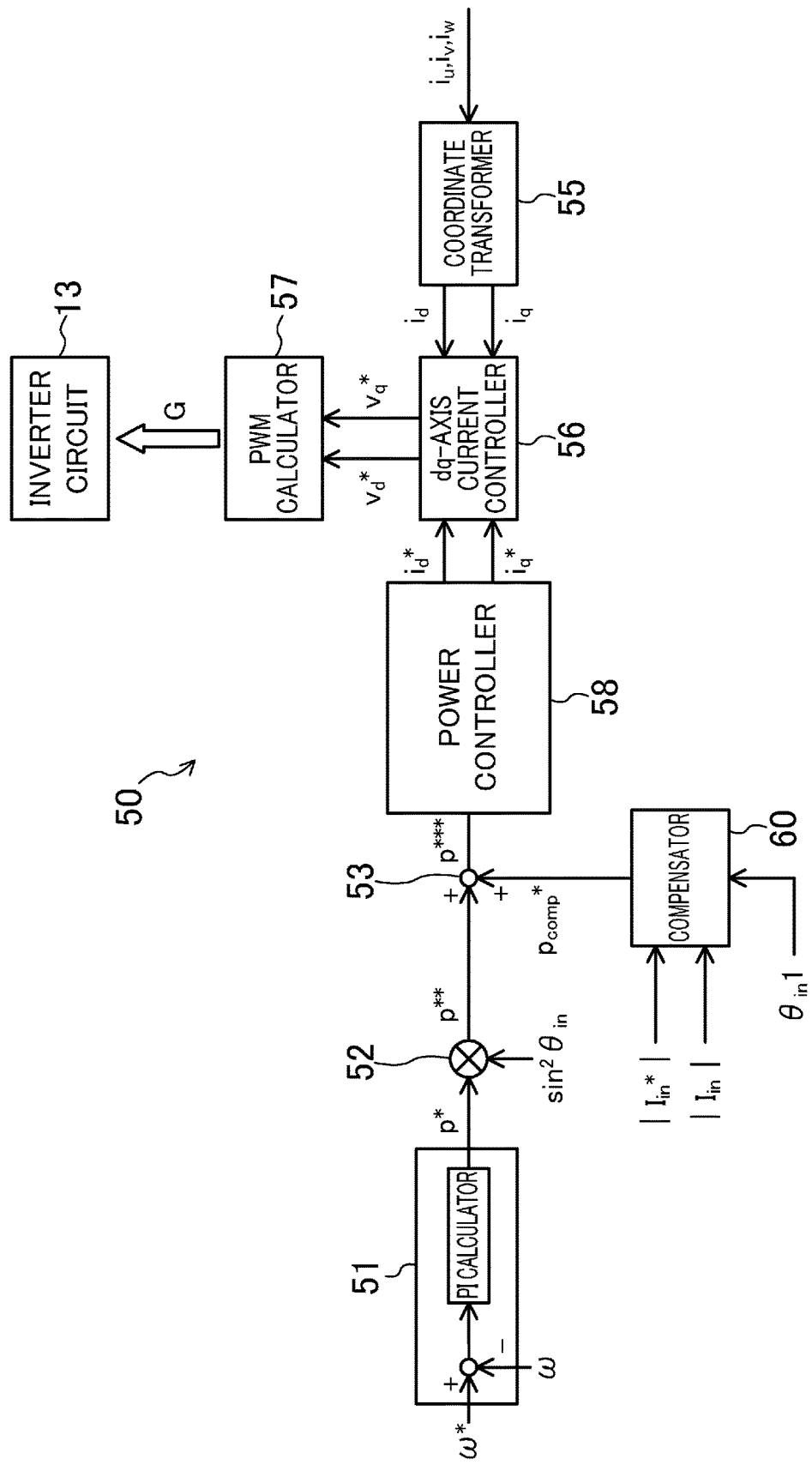
FIG. 12 illustrates a control system for an inverter circuit according to a fourth embodiment.

FIG. 12 illustrates a control system for an inverter circuit (13) according to a fourth embodiment. The controller (50) of this embodiment includes a velocity controller (51), a multiplier (52), an adder (53), a coordinate transformer (55), a power controller (58), a dq axis current controller (56), and a PWM calculator (57).

The velocity controller (51) calculates the deviation of the rotational angular frequency (ω) of the mechanical angle of the motor (20) from a command value (ω*) of the mechanical angle. Then, the velocity controller (51) performs proportional integral (PI) operation on the deviation and outputs a result of the operation as a first power command value (p*) to the multiplier (52).

The multiplier (52) multiplies together the square of the sine value ($\sin^2(\theta in)$) of the phase angle (θin) of the voltage (Vin) at the AC power supply (30) and the first power command value (p*), and outputs a result of the multiplication as a second power command value (p). This second power command value (p) is a command value of the power output from the inverter circuit (13) (i.e., power converter), and is an exemplary manipulated variable of the control to be performed by the power converter.

The adder (53) adds together the second power command value (p**) and a compensation power command value (pcomp*) (to be described later) generated by the compensator (60), and outputs a result of the addition (hereinafter referred to as a "drive power command value (p***)") to the power controller (58).

The power controller (58) calculates, based on the drive power command value (p***) and the number of revolutions (ω) of the motor, a motor torque command value, generates a d-axis current command value and a q-axis current command value in accordance with the motor torque command value, and then outputs them to the dq-axis current controller (56). Specifically, based on various motor constants such as a d-axis inductance, a q-axis inductance, the number of flux linkages, the coil resistance, and the number of motor poles, the power controller (58) generates a d-axis current command value and a q-axis current command value in accordance with the motor torque command value.

The coordinate transformer (55) calculates a d-axis current value (id) and a q-axis current value (iq) based on the angle of rotation (which is an electrical angle (θe)) of the rotor (not shown) of the motor (20) and phase currents (iu, iv, iw) of the inverter circuit (13).

The dq axis current controller (56) generates a d-axis voltage command value (Vd*) and a q-axis voltage command value (Vq*) so as to reduce the deviation of the d-axis current value (id) from the d-axis current command value (id*) and the deviation of the q-axis current value (iq) from the q-axis current command value (iq*), respectively, and outputs these voltage command values to the PWM calculator (57).

The PWM calculator (57) receives the d-axis and q-axis voltage command values (Vd*, Vq*), the DC link voltage (vdc), and the electrical angle (θe). Based on these values, the PWM calculator (57) generates a control signal (G) (hereinafter also referred to as a "PWM output") to control the ON/OFF operations of the respective switching elements (Su, Sv, Sw, Sx, Sy, Sz) of the inverter circuit (13) and outputs the control signal (G) to the inverter circuit (13). The PWM output (G) is updated on a predetermined period (hereinafter referred to as a "carrier period (Tc)" or an "update period (Tc)") basis.

<Compensator>

The compensator (60) generates a compensation power command value (pcomp*) to compensate for (as will be described later) the second power command value (p**). The compensator (60) includes a microcomputer (not shown) and a program installed therein to operate the microcomputer. As in the example shown in FIG. 4, the compensator (60) of this embodiment also includes a subtractor (61), a deviation storage (62), a first index generator (63), a power supply phase calculator (64), a second index generator (65), and a magnitude of compensation calculator (66).

—Subtractor (61)—

The subtractor (61) calculates the deviation of the output current value (|Iin|) of the converter circuit (11) from a current command (|Iin*|) specifying the output current value (|Iin|). This deviation is an exemplary value correlated to a disturbance that causes distortion in a current (Iin) to the power converter according to the present invention. Note that the current value (|Iin|) is a measured value. Also, the current command (|Iin*|) is generated as the product of the amplitude of the fundamental wave component of the input current value (Iin) of the converter circuit (11) and |sin(θin)|.

—Deviation Storage (62)—

The deviation storage (62) has a plurality (or an arrangement) of storage areas and stores the deviations calculated by the subtractor (61). This deviation storage (62) is an exemplary storage according to the present invention. The number (hereinafter referred to as "K") of the storage areas of the deviation storage (62) is set such that a period (hereinafter referred to as a storage period (Tm)) corresponding to $\pi/K$ [rad] of one voltage period of the AC power supply (30) (hereinafter referred to as a "power supply period") becomes equal to or shorter than one carrier period (Tc). If K is set as described above, the deviation storage (62) is allowed to store K deviations in a period corresponding to a half of one power supply period (hereinafter referred to as a "power supply half period"). In this embodiment, one storage period (Tm) agrees with one carrier period (Tc).

—First Index Generator (63)—

The first index generator (63) calculates an index (idx) specifying any of the storage areas of the deviation storage (62) based on the phase angle (θin)=θin1 when the control processing (such current control) is started. In this example, idx=θin1/(π/K) is supposed to be satisfied. Thus, the index (idx) falls within the range of 0 to K−1.

In the deviation storage (62), the deviation at the phase angle (θin1) is stored in a storage area associated with the index (idx) calculated. That is to say, the deviation storage (62) stores multiple deviations of the output current values (|Iin|) from the current command (|Iin*|) thereof in association with the phase angle (θin) of the voltage (Vin) of the AC power supply (30). Since the index (idx) and the phase angles (θin) are associated with each other as described above, multiple values (i.e., deviations) correlated to the disturbance to the intervals of the storage periods (Tm) are stored side by side in the deviation storage (62).

—Power Supply Phase Calculator (64)—

The power supply phase calculator (64) calculates the phase angle (θin2) at the timing of compensating for the second current command value (iT*). In this example, the power supply phase calculator (64) outputs, based on the phase angle (θin1) at the starting point of control processing (such as current control), the phase angle (θin2) at the endpoint of an update period (Tc) to which the output of the control processing is applied as a PWM signal.

—Second Index Generator (65)—

The second index generator (65) calculates, based on the phase angle (θin2) obtained by the power supply phase calculator (64), an index (idx) specifying any of the storage areas of the deviation storage (62). The index (idx) may be calculated in the same way as in the first index generator (63), and idx=θin1/(π/K) is supposed to be satisfied.

—Magnitude of Compensation Calculator (66)—

The magnitude of compensation calculator (66) calculates a compensation power command value (pcomp*). Specifically, using the index (idx) calculated by the second index generator (65), the magnitude of compensation calculator (66) retrieves a deviation from any of the storage areas of the deviation storage (62). In the following description, the deviation retrieved will be identified herein by Iin_err. Then, the magnitude of compensation calculator (66) calculates the compensation power command value (pcomp*) by pcomp*=−|Vin·sin(θin2)|×Iin_err. The compensation power command value (pcomp*) thus calculated is output to the adder (53) of the controller (50).

<How Power Conversion Device Operates>

Next, it will be described with reference to FIG. 5 how the power conversion device of this embodiment operates. In FIG. 5, shown are $m^{th}$ through $(m+2)^{th}$ carrier periods (Tc), where m is an integer equal to or greater than zero.

When a carrier period (Tc) begins, the controller (50) starts performing the control processing. For example, when the control processing for the $m^{th}$ carrier period (Tc) starts, the controller (50) measures the output current value (|Iin|) and the phase angle (θin1). Then, in the controller (50), the velocity controller (51) generates a first power command value (p*) based on the deviation of the rotational angular frequency (ω) from a command value (ω*) thereof. The first power command value (p*) is modulated by being multiplied by $sin^2(θin)$ by the multiplier (52), and then is output as the second power command value (p**).

Meanwhile, in the compensator (60), the second index generator (65) calculates an index (idx) based on the phase angle (θin1) detected. In this case, the value calculated is supposed to be idx=j2. Then, the magnitude of compensation calculator (66) retrieves a deviation (hereinafter identified by Iin_err(j2)) associated with the index (idx)=j2 thus calculated from the deviation storage (62). The magnitude of compensation calculator (66) calculates the compensation power command value (pcomp*) using the deviation Iin_err (j2) thus retrieved.

This compensation power command value (pcomp*) is added by the adder (53) to (and compensates for) the second power command value (p). In this manner, the second power command value (p) is compensated for such that the distortion caused in the output current (Iin) due to the deviation (correlated to the disturbance) of the output current value (|Iin|) from the current command (|Iin*|) is reduced. The second power command value (p) thus corrected is output as a drive power command value (p*) to the power controller (58).

In this case, the deviation (Iin_err) used to calculate the compensation power command value (pcomp*) is that of a power supply half period (n−1) preceding the present power supply half period (n). That is to say, the second power command value (p**) in the phase corresponding to the index (idx)=j2 of the $n^{th}$ power supply half period is compensated for based on the deviation Iin_err(j2) stored in the phase corresponding to the index (idx)=j2 of the $(n-1)^{th}$ power supply half period.

As can be seen, in the controller (50), a d-axis current command value (id*) and a q-axis current command value (iq*) are generated based on the drive power command value (p*) that is the compensated second power command value (p). Then, the dq axis current controller (56) generates a d-axis voltage command value (Vd*) and a q-axis voltage command value (Vq*). When the d-axis voltage command value (Vd*) and q-axis voltage command value (Vq*) are generated, the PWM calculator (57) outputs a control signal (G) to the inverter circuit (13). In response, the inverter circuit (13) operates so as to reduce the distortion of the output current waveform of the converter circuit (11). The LC resonance produced by the capacitor (12a) and the reactors (L1, L2) may be reduced in this manner based on the stored deviation (i.e., a value correlated to the disturbance), because the LC resonance has a steady-state repetitive waveform.

Meanwhile, in the compensator (60), the deviation storage (62) updates, based on a disturbance detected every carrier period (Tc), the storage area to store the disturbance. For example, in the $m^{th}$ carrier period (Tc), when finishing outputting the compensation power command value (pcomp*), the compensator (60) updates the data stored in the deviation storage (62) based on the output current value (|Iin|) and phase angle (θin1) which were detected when the $m^{th}$ carrier period (Tc) began. Specifically, the first index generator (63) calculates an index based on the phase angle (θin1). In this example, idx=j1. As a result, in the compensator (60), the $j1^{th}$ deviation Iin_err(j1) is updated.

The same operation is performed in the $(m+1)^{th}$ carrier period (Tc) as well. In the $(m+1)^{th}$ carrier period (Tc), idx=j1+1 is satisfied, because the storage period (Tm) agrees with the carrier period (Tc). In the $(m+1)^{th}$ carrier period (Tc), supposing the present power supply half period is the $n^{th}$ one, the second current command value (iT*) in a phase corresponding to the index (idx)=j2+1 of the $n^{th}$ power supply half period is compensated for based on the deviation Iin_err(j2+1) stored in the phase corresponding to the index (idx)=j2+1 of the $(n-1)^{th}$ power supply half period. Also, in the $(m+1)^{th}$ carrier period (Tc), the $(j2+1)^{th}$ deviation Iin_err (j2+1) is updated.

In the embodiment described above, the index (idx) is calculated based on the phase angle (θin) when the control processing is started in each carrier period (Tc). The output current value (|Iin|) is also detected at the starting point of the control processing. If the carrier period (Tc) agrees with the storage period (Tm) as in this embodiment, the index (idx) is updated synchronously with the start of the control processing, and the index increments one by one every control period. Thus, every data in the deviation storage (62) is updated without exception every power supply half period.

<Advantages of This Embodiment>

According to this embodiment, the manipulated variable of the power control performed by the inverter circuit (13) is compensated for. Even so, the same or similar advantages to those of the first embodiment described above may also be achieved.

<<Fifth Embodiment of This Invention>>

Figure 13:
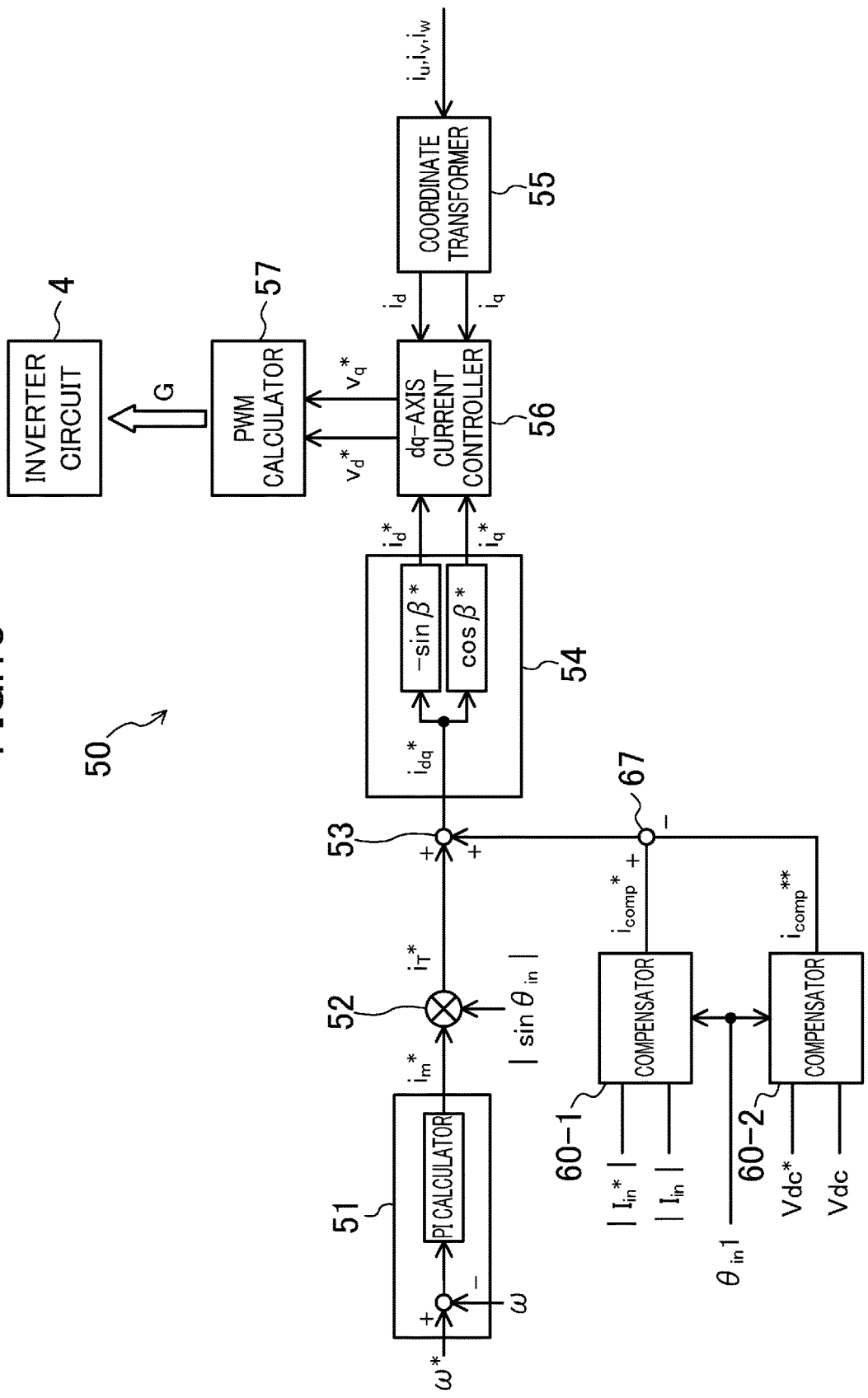
FIG. 13 illustrates a control system for an inverter circuit according to a fifth embodiment.

FIG. 13 illustrates a control system for an inverter circuit (13) according to a fifth embodiment. In this embodiment, another compensator (60) and a subtractor (67) are added to the control system of the first embodiment. The additional compensator (60) also has the same configuration as the compensator (60) of the first embodiment. However, a different signal is input to the additional compensator (60) from the one input to the compensator (60) of the first embodiment. In FIG. 13, these two compensators (60) are respectively identified by reference signs with two different branch numbers (−1, −2). In this example, the original compensator is identified by (60-1) and the additional compensator is identified by (60-2).

In the additional compensator (60-2), the subtractor (61) calculates the deviation of the DC link voltage (vdc) from a command value (vdc*) of the DC link voltage (vdc). Specifically, the subtractor (61) subtracts the DC link voltage from the command value (vdc*) and outputs the difference thus obtained as the deviation.

In the deviation storage (62) of the additional compensator (60-2), the deviation of the DC link voltage (vdc) from the command value (vdc*) thereof is stored in association with the phase angle (θin) of the voltage (Vin) of the AC power supply (30). This deviation is also an exemplary value correlated to a disturbance that causes distortion in the current (Iin) to the power converter according to the present invention.

Then, the compensation current command value (icomp**) obtained by the additional compensator (60-2) is subtracted by the subtractor (67) from the output of the original compensator (60-1). The output of the subtractor (67) is supplied as a compensated value of the second current command value (iT*) to the adder (53).

With such a configuration adopted, according to this embodiment, the compensation is made based on not only the output current value (|Iin|) of the converter circuit (11) but also the DC link voltage (vdc) as well. Such additional compensation based on the DC link voltage (vdc) may reduce the disturbance to be caused between the supply voltage (Vin) and the DC link voltage (vdc), and may bring the output current value (|Iin|) of the converter circuit (11) even closer to the current command (|Iin*|).

Specifically, according to this embodiment, if the voltage of the DC section (12) (i.e., the voltage at the input terminal of the inverter circuit (13)) is greater than the command value (vdc*) of the DC link voltage (vdc), the second current command value (iT*) is compensated for such that the output power of the inverter circuit (13) is further increased. On the other hand, if the DC link voltage (vdc) is less than the command value (vdc*), the second current command value (iT*) is compensated for such that the output power of the inverter circuit (13) is further decreased.

As can be seen from the foregoing description, according to this embodiment, the compensated value is obtained based on the stored deviations (i.e., values correlated to a disturbance), and therefore, the compensation may be done speedily.

<<Sixth Embodiment of This Invention>>

Figure 14:
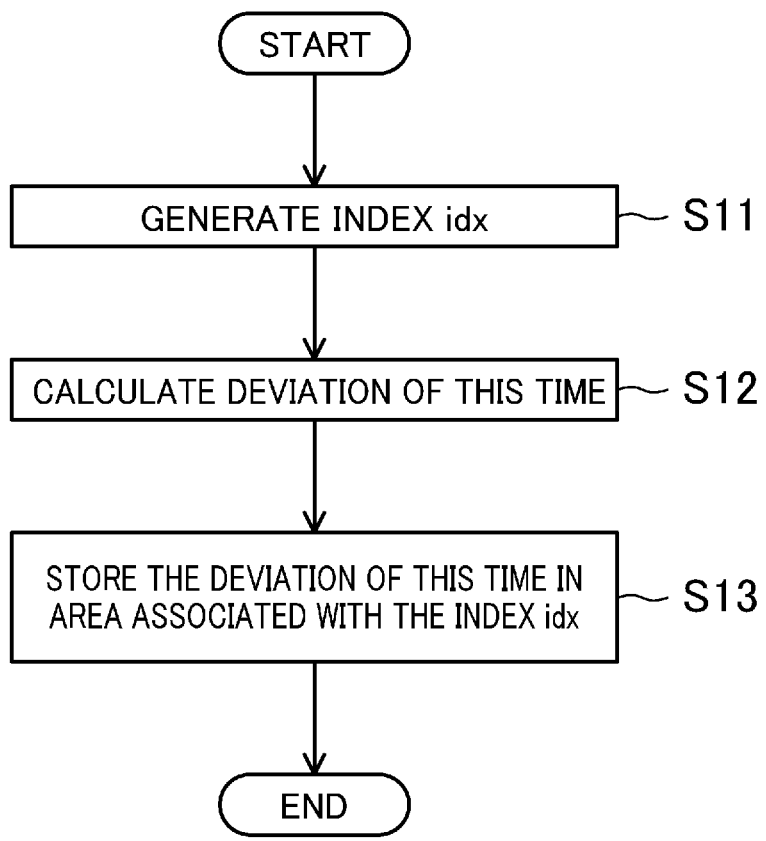
FIG. 14 is a flowchart showing how to update a deviation storage according to a sixth embodiment.

A sixth embodiment of the present invention to be described below is a method of updating the deviation storage (62) differently from any of the embodiments described above. FIG. 14 is a flowchart showing how to update the deviation storage (62) according to the sixth embodiment of the present invention. This embodiment provides the flow shown in FIG. 14 by changing the compensator (60) of the first embodiment. Note that the series of processing steps shown in FIG. 14 are carried out after the current command (|Iin*|) and the output current value (|Iin|) have been obtained within the carrier period (Tc), and are performed repeatedly every carrier period (Tc).

First of all, in the compensator (60), the first index generator (63) generates an index (idx) indicating the storage location of the deviation of this time in the deviation storage (62) (in Step S11). The first index generator (63) calculates this index (idx) based on the phase angle (θin1). In this example, idx=θin1/(π/K) is satisfied, and the phase angle (θin1) is cleared every π(i.e., every power supply half period). Thus, the index (idx) generated by the first index generator (63) increments one by one, and changes cyclically within the range of 0 to K−1, as the phase angle (θin1) increases monotonically.

Next, the compensator (60) makes the subtractor (61) calculate the deviation of the output current value (|Iin|) from the current command (|Iin*|) (in Step S12).

Subsequently, the compensator (60) stores the deviation of this time (i.e., the deviation obtained in Step S12) in any of the areas of the deviation storage (62) associated with the index (idx) (in Step S13). Note that when the deviation is stored, the moving average between the deviation of this time and a past value stored in the deviation storage (62) may be calculated and the result may be stored instead of the deviation of this time.

The series of these three processing steps S11, S12, and S13 will be performed repeatedly every carrier period (Tc) until the deviation storage (62) obtains a predetermined number of (i.e., K in this example) values to be stored. That is to say, according to this embodiment, values correlated to a disturbance (i.e., the current command (|Iin*|) and the output current value (|Iin|) in this example) are sampled over multiple periods of the voltage (Vin) of the AC power supply (30). In this manner, the deviation storage (62) is allowed to obtain the predetermined number (i.e., K in this example) of values to be stored.

As can be seen from the foregoing description, according to this embodiment, values correlated to the disturbance are also stored in the deviation storage (62) and the compensation current command value (icomp*) to compensate for the second current command value (iT*) may be generated based on those correlated values. Thus, according to this embodiment, the distortion of the output current of the converter circuit (11) (i.e., the distortion of an input current to the inverter circuit (13)) caused by a disturbance with a repetitive waveform such as LC resonance may also be reduced easily and speedily. That is to say, the deviation of a current from a command value thereof may also be reduced according to this embodiment.

Particularly if the disturbance has a short variation period (i.e., too short to represent the variation in disturbance accurately by making sampling every carrier period (Tc)), then it is recommended that the deviation obtaining method of this sixth embodiment (see FIG. 14) in which no interpolation is made intentionally with one storage period (Tm) set to be shorter than one disturbance variation period be adopted. In that case, not every data stored in the deviation storage (62) is updated in a power supply half period, but the data stored in the deviation storage (62) is updated through sampling over multiple power supply half periods. Thus, if the disturbance occurs repeatedly synchronously with a power supply half period, the values correlated to the disturbance may be stored accurately under the configuration of this sixth embodiment.

<<Other Embodiments>>

Note that the control system of a power conversion device generally includes a velocity control system. In that case, the magnitude of compensation to be made by the compensator (60) may be set to be zero when the power conversion device starts running.

Also, if it is known in advance that a significant variation in load (e.g., when torque control needs to be performed synchronously with either acceleration or deceleration of the motor (20) or the rotational period of the motor (20)) should occur asynchronously with a power supply period, the magnitude of compensation to be made by the compensator (60) may be set to be zero.

Also, when the deviation of an output current value (|Iin|) from a current command (|Iin*|) is calculated, the output current values (|Iin|) over multiple power supply half periods may be averaged on an index (idx) basis, and the deviation of the average value from the current command (|Iin*|) may be obtained. The output current values (|Iin|) may be averaged if the moving average of the output current values (|Iin|) is obtained on an index (idx) basis, for example. Note that if interpolation is made for the deviation storage (62) as in the variation of the first embodiment, non-averaged data is suitably used as data for interpolation.

In addition, the compensation based on the capacitor energy (Ce) (see the second embodiment) does not always have to be carried out in combination with the compensation based on the output current value (|Iin|) (see the first and second embodiments). In other words, in the second embodiment, the compensation based on the output current value (|Iin|) may be omitted.

Furthermore, the power conversion device (10) does not have to include the converter circuit (11) and the inverter circuit (13). Optionally, the power conversion device (10) may also be implemented as a so-called "matrix converter" configured to convert an alternating current directly into an alternating current having a predetermined frequency and a predetermined voltage.

Furthermore, the values correlated to the disturbance are not limited to the exemplary ones adopted in the embodiments and their variations described above. Alternatively, the correlated value may also be a deviation of a current to a power converter (such as the inverter circuit (13) or a matrix converter) from the command value of the current to the power converter. Still alternatively, the correlated value does not have to be a deviation but may also be a current to a power converter (such as the inverter circuit (13) or a matrix converter), the output current value (|Iin|) of the converter circuit (11), the voltage (vdc) of the capacitor (12a), or the energy of the capacitor (12a), for example.

Furthermore, the controller (50) may compensate for the q-axis current command value (iq*) instead of the second current command value (iT*).

INDUSTRIAL APPLICABILITY

The present invention is useful as a power conversion device.

DESCRIPTION OF REFERENCE CHARACTERS

10 Power Conversion Device
12a Capacitor

13 Inverter Circuit (Power Converter)
30 AC Power Supply
50 Controller (Power Conversion Controller)
60 Compensator (Power Conversion Controller)
62 Deviation Storage (Storage)

The invention claimed is:

1. A power conversion device comprising:
a power converter configured to convert, by performing ON/OFF operations on a plurality of switching elements, either an alternating current output from an AC power supply or a direct current converted from the alternating current into a different alternating current having a predetermined frequency and a predetermined voltage;
a capacitor configured to smooth a ripple voltage generated as a result of the ON/OFF operations;
a storage configured to store multiple values, each correlated to a disturbance that causes distortion in an input current to the power converter, in association with a phase angle of a voltage of the AC power supply; and
a power conversion controller configured to control the ON/OFF operations by using the multiple values stored in the storage to compensate for a manipulated variable of control performed by the power converter in association with the phase angle of the voltage of the AC power supply.

2. The power conversion device of claim 1, wherein each of the multiple values correlated to the disturbance is selected from a group consisting of:
the input current to the power converter;
an output current value of a converter circuit configured to convert an output of the AC power supply into a direct current;
a voltage of the capacitor;
an energy of the capacitor;
a deviation of the input current to the power converter from a command value of the input current to the power converter;
a deviation of the output current value of the converter circuit configured to convert the output of the AC power supply into a direct current from a current command specifying the output current value;
a deviation of the voltage of the capacitor from a command value of the voltage of the capacitor; and
a deviation of the energy of the capacitor from a command value of the energy.

3. The power conversion device of claim 1, wherein the power conversion controller controls a power of the power converter based on the multiple values stored in the storage.

4. The power conversion device of claim 1, wherein the power conversion controller controls a current at the power converter based on the multiple values stored in the storage.

5. The power conversion device of claim 1, wherein the power conversion controller compensates for the manipulated variable using the multiple values correlated to the disturbance.

6. The power conversion device of claim 1, wherein if the multiple values stored in the storage are discontinuous, the power conversion controller makes interpolation between the discontinuous values using data stored in the storage.

7. The power conversion device of claim 2, wherein the power conversion controller controls a power of the power converter based on the multiple values stored in the storage.

8. The power conversion device of claim 2, wherein the power conversion controller controls a current at the power converter based on the multiple values stored in the storage.

9. The power conversion device of claim 2, wherein the power conversion controller compensates for the manipulated variable using the multiple values correlated to the disturbance.

10. The power conversion device of claim 2, wherein if the multiple values stored in the storage are discontinuous, the power conversion controller makes interpolation between the discontinuous values using data stored in the storage.

11. The power conversion device of claim 3, wherein the power conversion controller compensates for the manipulated variable using the multiple values correlated to the disturbance.

12. The power conversion device of claim 3, wherein if the multiple values stored in the storage are discontinuous, the power conversion controller makes interpolation between the discontinuous values using data stored in the storage.

13. The power conversion device of claim 4, wherein the power conversion controller compensates for the manipulated variable using the multiple values correlated to the disturbance.

14. The power conversion device of claim 4, wherein if the multiple values stored in the storage are discontinuous, the power conversion controller makes interpolation between the discontinuous values using data stored in the storage.

15. The power conversion device of claim 5, wherein if the multiple values stored in the storage are discontinuous, the power conversion controller makes interpolation between the discontinuous values using data stored in the storage.

16. The power conversion device of claim 7, wherein the power conversion controller compensates for the manipulated variable using the multiple values correlated to the disturbance.

17. The power conversion device of claim 7, wherein if the multiple values stored in the storage are discontinuous, the power conversion controller makes interpolation between the discontinuous values using data stored in the storage.

18. The power conversion device of claim 8, wherein the power conversion controller compensates for the manipulated variable using the multiple values correlated to the disturbance.

19. The power conversion device of claim 8, wherein if the multiple values stored in the storage are discontinuous, the power conversion controller makes interpolation between the discontinuous values using data stored in the storage.

20. The power conversion device of claim 9, wherein if the multiple values stored in the storage are discontinuous, the power conversion controller makes interpolation between the discontinuous values using data stored in the storage.

* * * * *